United States Patent [19]

Napier et al.

[11] Patent Number: 4,902,358

[45] Date of Patent: Feb. 20, 1990

[54] CERAMIC TO METAL BRAZING

[75] Inventors: Buel D. Napier, Columbus, Ind.; George W. Wolter, Whitehall, Mich.; Renita G. King, Brownstown, Ind.

[73] Assignee: Cummins Engine Company, Inc., Columbus, Ind.

[21] Appl. No.: 273,754

[22] Filed: Nov. 16, 1988

Related U.S. Application Data

[63] Continuation of Ser. No. 49,092, May 13, 1987, abandoned.

[51] Int. Cl.$^4$ ............................................. C21D 5/00
[52] U.S. Cl. ..................................... 148/127; 148/321; 228/903
[58] Field of Search .................. 148/127, 321, 125, 14; 228/122, 124, 903; 123/90.51, 90.39

[56] References Cited

U.S. PATENT DOCUMENTS

| | | | |
|---|---|---|---|
| 2,875,663 | 10/1958 | Beggs | 228/124 |
| 3,034,205 | 5/1962 | Ames | 228/122 |
| 3,091,028 | 5/1963 | Westbrook et al. | 228/124 |
| 3,226,822 | 1/1966 | Budde et al. | 228/903 |
| 3,615,920 | 10/1971 | Talento | 148/125 |
| 4,366,785 | 1/1983 | Goloff et al. | 123/90.51 |
| 4,485,770 | 12/1984 | Saka et al. | 123/90.39 |

OTHER PUBLICATIONS

Metals Handbook vol. 2, 8th edition p. 50.
"Vacuum Brazing Ceramics to Metals", Mizuhara, Advanced Materials and Process Inc. Metal Progress, 2/87.
"Ceramic-to-Metal Joint Configuration", p. 17–28.

*Primary Examiner*—S. Kastler
*Attorney, Agent, or Firm*—Sixbey, Friedman, Leedom & Ferguson

[57] ABSTRACT

A method for forming extremely strong ceramic-to-metal joints is provided which is particularly applicable to the formation of components for internal combustion engines. The present method simultaneously brazes a ceramic to a metal and creates a normalized microstructure and desired mechanical in the metal in a single heating step. The ceramic is metallized, a suitable alloy is applied, and the ceramic-alloy-metal composite is first heated to about 160° F. to 1750° F. for about one hour and then gas quenched in nitrogen or argon, or a gas with similar heat transfer capabilities.

12 Claims, 1 Drawing Sheet

CERAMIC TO METAL BRAZING

This application is a continuation of application Ser. No. 049,092, filed May 13, 1987 abandoned.

TECHNICAL FIELD

The present invention relates generally to the joining of ceramic and metal materials and specifically to a method for simultaneously attaching a ceramic element to a metal element and heat treating the metal element to achieve a desired microstructure and mechanical properties.

BACKGROUND ART

Because of their outstanding wear-resistant characteristics ceramic materials have found increasing application in internal combustion engines and similar environments where continuous contact between engine components occurs during engine operation. Valve actuating mechanisms, in particular, have surfaces which are subject to frequent contact with other engine components. Depending upon the type of engine in which the valve actuating mechanism is located, these contact surfaces may be located on a cross-head assembly, on a tappet or on a rocker arm. Because such surfaces are subjected to a high degree of contact, they should be formed of a material characterized by high abrasion and wear resistance which will not fail during the life of the engine component. Materials having these characteristics are often not suitable for use in forming the entire engine component and, therefore, must be secured in some manner to the engine component to form the contact surface.

Materials which provide a durable, abrasion resistant surface for this purpose are known in the prior art. For example, U.S. Pat. No. 4,485,770 to Saka et al. describes such a material. The material disclosed in this reference is an iron-based sintered alloy which is pressed to the desired shape, sintered and then heat treated to produce a pad having a predetermined alloy structure. The pad thus formed must be attached in some manner to the engine component contact surface. The Saka patent, however, is silent on exactly how this is accomplished in a manner which produces a durable, effective abrasion-resistant surface.

An effective wear resisting insert for the cam contacting surface of an engine tappet formed from a highly wear resistant ceramic material such as silicon carbide is disclosed in U.S. Pat. No. 4,366,785 to Goloff et al. The ceramic insert disclosed in this patent is press-fitted into a recess in the tappet rather than permanently bonded or secured to the tappet and, consequently, unless the proper interference is achieved, the ceramic insert will not remain attached to the tappet.

Although ceramic materials are generally preferred over metal alloys for the formation of engine component contact surfaces because of their superior abrasion and wear-resistant characteristics, the attachment of ceramic contact surfaces is more difficult because the engine components to which they are attached are usually formed from metal. The different coefficients of thermal expansion of metals and ceramics causes the metal-to-ceramic joint to be stressed and ultimately results in the separation of the contact surface from the engine component. Methods for creating an effective metal-to-ceramic joint have been disclosed by the prior art. U.S. Pat. No. 3,034,205 to Ames is exemplary of these prior art methods. Ames discloses an alloy consisting of copper, silver, indium, nickel and titanium which can be employed to braze a metal, particularly stainless steel, to a ceramic by heating to a temperature of about 1800° F. to 200° F. for at least five minutes, preferably in an atmosphere of cracked ammonia gas. U.S. Pat. Nos. 2,857,663 to Beggs; 3,091,028 to Westbrook et al. and 3,226,822 to Budde et al. also disclose methods of bonding a ceramic and a metal. However, none of the aforementioned patents discloses the formation of a ceramic-to-metal bond which would be likely to withstand the stresses encountered by a contact surface in an engine environment.

The metal engine components which support the above-described contact surfaces are subject to stresses during engine operation and therefore, must themselves be strong, durable and capable of meeting specified mechanical and physical characteristics. Depending upon the material from which these components are formed, such characteristics may be achieved by heat treatment. In the case of a cast iron component, heat treatment followed by cooling will yield the required microstructure and properties. It would be highly desirable and economical to heat treat the metal engine component and attach a wear-resistant ceramic surface element in a minimum number of process steps. U.S. Pat. No. 3,615,920, to Talento discloses a combination heat treatment and braze cycle for metal which results in the modification of its microstructure and produces desirable mechanical properties in the metal thus treated. There is, however, no suggestion in this reference that the multi-step method method described therein could be applied to metals other than stainless steel or that the braze cycle portion of this method could be employed to attach a ceramic material to the metal.

Consequently, the prior art fails to show a wear-resistant ceramic contact surface element permanently secured by brazing to a metal internal combustion engine component wherein a single process simultaneously brazes the ceramic element to the metal and achieves the desired microstructure and mechanical properties in the metal forming the engine component.

DISCLOSURE OF THE INVENTION

It is a primary object of the present invention, therefore, to overcome the disadvantages of the prior art discussed above.

It is another object of the present invention to provide a method for bonding a ceramic material to a metal material which simultaneously develops the required microstructure and mechanical properties in the metal.

It is yet another object of the present invention to provide a method for simultaneously brazing a ceramic material to a metal material and austenitizing the metal.

It is a further object of the present invention to provide a method for securely bonding a durable, wear-resistant ceramic element to a metal component of an internal combustion engine wherein the ceramic is brazed to the metal and a normallized microstructure is simultaneously developed in the metal engine component.

It is a still further object to provide a method for simultaneously brazing a ceramic element to a metal internal combustion component and austenitizing the metal component, wherein a metallized ceramic element, a brazing alloy and the metal component are first heated and then gas quenched.

The aforesaid objects are achieved by providing a method for joining a ceramic element to a metal element including the steps of metallizing the ceramic element, applying a brazing alloy to wet the metallized ceramic, subjecting the ceramic element, brazing alloy and metal element to heating in a vacuum furnace and then gas quenching in nitrogen or argon. The resulting composite is characterized by an extremely strong ceramic-to-metal joint and a core hardness in the metal which renders it especially suitable for use in an internal combustion engine environment.

Other objects and advantages will become apparent from the following description, claims and drawings.

BEST MODE FOR CARRYING OUT THE INVENTION

An internal combustion engine environment typically includes engine components which make frequent contact during engine operation and, consequently, are extremely susceptible to wear. It is highly desirable, therefore, to form the surfaces of these components from materials which will withstand the constant contact experienced during engine operation without undue wear and abrasion. Engine components which include contact surfaces may be fabricated from metals of different types. For example, rocker arms and crosshead assemblies are usually formed from cast iron, while tappets may be formed from stainless steel. All of these structures generally include at least one surface which is subject to frequent contact during engine operation. Although the present invention is discussed as comprising a part of a crosshead assembly for an internal combustion engine, it can be employed with equally advantageous results wherever the attachment of a wear-resistant ceramic to metal is desired.

Figure 1:
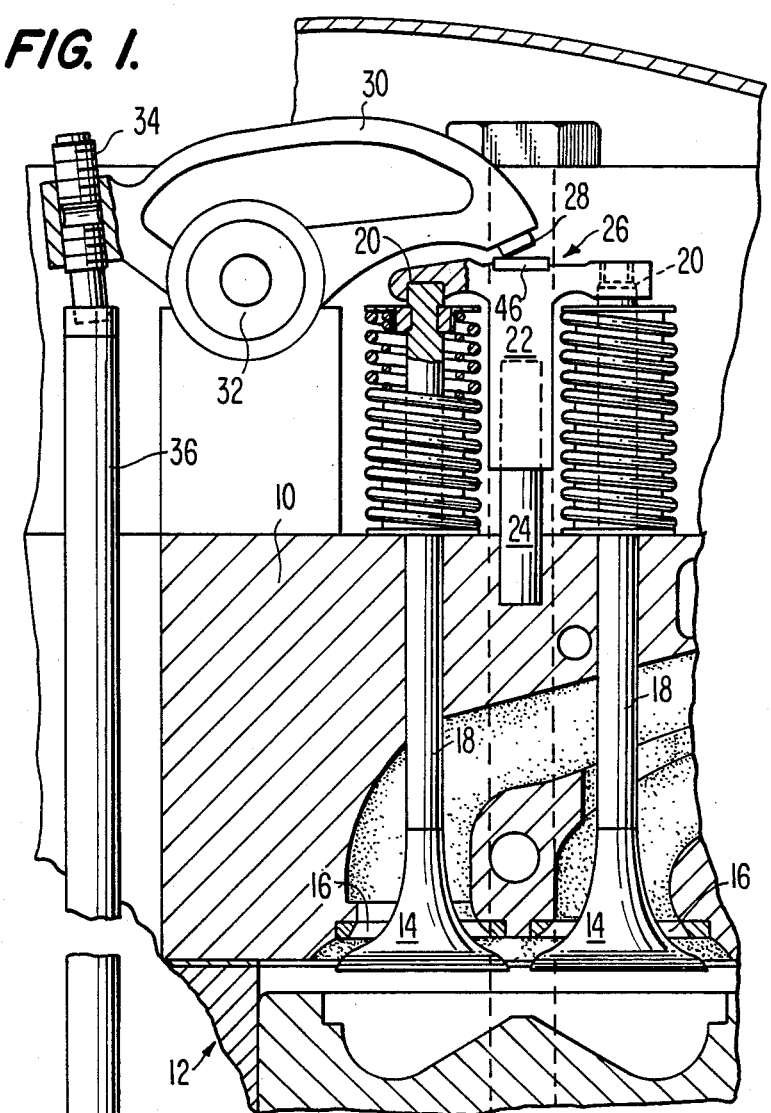
FIG. 1 is a fragmentary cross-sectional view of the head portion of an internal combustion engine illustrating two types of contact surfaces found therein.

Referring to the drawings, FIG. 1 illustrates, in fragmentary cross-section, an internal combustion engine. The method of the present invention is particularly useful in the production of some of these components. The engine depicted in FIG. 1 includes a head 10 and an engine block 12. Exhaust poppet valves 14, which open and close exhaust ports 16, include stems 18. The upper ends of stems 18 are received in recesses 20 in a T-shaped crosshead assembly 22. The crosshead assembly 22 may be mounted on the engine head by a guide pin 24.

The crosshead assembly 22 has an abutment surface 26 acted on by a pad 28 on one end of a rocker arm 30. The rocker arm 30 is pivotally mounted on a shaft 32 to pivot between a position where pad 28 fully contacts abutment surface 26 and a position where pad 28 is completely out of contact with surface 26. The opposite end of the rocker arm includes a threaded pin 34 which is received by a push rod 36. The opposite end of the push rod 36 is secured to a tappet 38 including a cam contacting element 40 which rides on the surface of a cam 42 mounted on the engine camshaft 44. The push rod 36 is reciprocated by cam 42 to cause the pad 28 on rocker arm 30 to contact crosshead abutment surface 26 to force valves 14 from a closed to an open position at the correct time and for the proper interval.

During engine operation rocker arm pad 28 will contact crosshead abutment surface 26 thousands of times each minute. The repeated abrading and heat inducing action thus created by pad 28 on surface 26 can lead to significant damage to this surface and, ultimately, the malfunctioning of the crosshead assembly 22 for its intended purposes in opening exhaust valves 14. The present invention, however, provides a solution to this problem. An abrasion and wear resistant pad 46 is provided in the abutment surface 26 of the crosshead assembly 22 at the location where pad 28 of the rocker arm 30 contacts surface 26 during engine operation. In order for pad 46 to function effectively and thus provide the abrasion-resistant surface required to sustain the degree of contact experienced during engine operation, it must be formed of a material which will tolerate these stresses. Additionally, pad 46 must be securely attached to crosshead assembly 22 so that it will remain in place despite being subjected to repeated contact thousands of times each minute.

The pad 46 will preferably be formed of one of several commercially available wear and abrasion resistant ceramics which are capable of withstanding the temperatures typically encountered in an internal combustion engine. Different types of sintered silicon nitride ceramics have been successfully employed and are, therefore, preferred for this purpose, although the method of the present invention could be used to secure a pad 46 made of other functionally equivalent ceramic materials.

An internal combustion engine crosshead assembly, such as crosshead assembly 22, is usually formed from cast iron. Consequently, the secure bonding of the ceramic material of pad 46 to the cast iron crosshead assembly 22 must be achieved if the pad is going to be available to function properly. The present invention provides a method whereby a ceramic material may be securely bonded to cast iron so that the resulting structure will remain operative in an internal combustion engine environment for an extended period. The method of the present invention, moreover, in addition to securely bonding a ceramic pad, like pad 46, to a cast iron engine component, like crosshead assembly 22, simultaneously results in a normallized microstructure in the cast iron so that required mechanical properties are achieved in the cast iron component.

The silicon nitride or equivalent ceramic material employed to form the pad 46 is preferably cleaned and then metallized to improve the wettability of the ceramic and, thus, the adherence of the ceramic to the brazing alloy chosen to form the ceramic-to-metal bond. The metallization of the ceramic functions as a surface preparation step and may be accomplished by one of a variety of known techniques for metallizing a ceramic. Such techniques include sintered metal powder processes, reactive- or refractory metal salt coating processes, and vapor deposition processes. A piece of metallized ceramic may be cut to form pad 46 or a piece of ceramic pre-cut to the required shape and size may be metallized as required.

A suitable brazing alloy is required to "wet" the surface of the metallized ceramic to promote the formation of a strong, secure ceramic-to- metal bond. An alloy consisting of titanium, copper and silver functions effectively to bond a silicon nitride ceramic to cast iron. However, other, equivalent brazing alloys having suitable melting ranges and wetting characteristics could be employed with similar results. The exact brazing alloy selected will depend upon the specific ceramic to be bonded.

Figure 2:
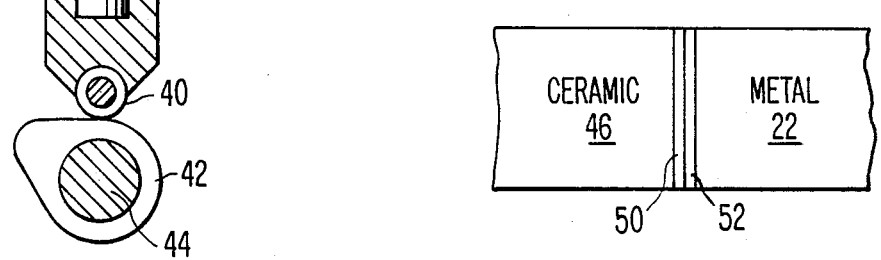
FIG. 2 is a schematic illustration of a ceramic-metal bond formed according to the present invention.

FIG. 2 illustrates schematically the bonding of ceramic pad 46 to cast iron crosshead assembly 22 according to the present invention. Strip 50 represents a metallized layer applied to the surface of the ceramic, and strip 52 represents the titanium, copper, silver (TiCuAg) or equivalent brazing alloy used to braze the ceramic to the cast iron and form the strong ceramic-to-metal bond achieved by the present process.

To achieve the particularly secure, stable ceramic-to-metal Joint represented by FIG. 2 and simultaneously normallize the metallic microstructure of the cast iron crosshead assembly 22, a composite structure like that shown in FIG. 2 comprising a metallized ceramic pad 46 which has been wet with a brazing alloy 52 and applied to a cast iron crosshead assembly 22 is subjected to a temperature of about 1600° F. to about 1750° F. in a vacuum furnace. It is possible to achieve a normalized microstructure in cast iron by holding the iron at a temperature of 1600° F. to 1750° F. for at least two hours and quenching. However, it has been discovered that brazing of the ceramic pad 46 to the iron crosshead assembly 22 and austenitization of the cast iron element may be achieved simultaneously by subjecting the composite to the 1600° F. to 1750° F. temperature in a vacuum for about one hour. The joining of the ceramic to the metal by the brazing alloy is completed within this time period under these conditions. In addition, a matrix structure is developed in the cast iron upon quenching which ranges from acicular to extremely fine pearlite with small amounts of free ferrite, depending upon the thickness of the section examined, hardenability of the cast iron and quench rate.

Following the formation of the ceramic-to-metal bond and the development of the austenitized microstructure in the cast iron, the composite is subjected to gas quenching in a nitrogen or argon environment. Gas quenching under these conditions permits cooling from the brazing/austenitizing temperature at a controlled rate, thus attaining the described structural properties in the metal and resulting in the required mechanical properties in the cast iron crosshead. For example, a core hardness of 26 to 31 RC may be achieved in cast iron subjected to the method of the present invention. Since internal combustion engine manufacturers typically specify cast iron components having a lower core hardness, crosshead assemblies having ceramic pads bonded thereto in accordance with the present method will generally exceed manufacturers' specifications. The result is accomplished in a single processing step instead of the multiple steps previously required.

The present method, moreover, produces an extremely strong ceramic-to-metal joint. Tests conducted on the composite of FIG. 2 wherein these composites were subjected to high torque forces demonstrated that the ceramic pad 46 fractures before the ceramic-to-metal braze joint separates or breaks. Consequently, the method of the present invention can be used effectively to produce a ceramic-to-metal joint capable of withstanding stresses of the degree and duration typically encountered in an internal combustion engine.

While the ceramic-to-metal brazing method of the present invention has been described specifically with reference to the bonding of a ceramic pad 46 to a cast iron crosshead assembly 22 in an internal combustion engine, there are other engine components which could be formed according to this method. For example, the cam contacting member 40 of tappet 38 could be provided with a ceramic surface (not shown) according to the present invention. Similarly, any metal (preferably cast iron) engine component subject to repeated contact could be provided with a durable, wear-resistant surface while simultaneously enhancing the mechanical properties of the metal to which the ceramic was bonded.

INDUSTRIAL APPLICABILITY

The method of the present invention will find its primary application in the production of internal combustion engine components where it is desired to bond a ceramic component to a metal, preferably a cast iron, component and wherever it is desired simultaneously to form an extremely strong ceramic-to-metal bond and to obtain a metal component characterized by enhanced mechanical properties with a single heat treatment.

We claim:

1. A method for forming a ceramic and cast iron component for use in an internal combustion engine, including the steps of:
   a. metallizing a portion of the surface of a silicon nitride ceramic element;
   b. applying an alloy consisting essentially of titanium, copper and silver to said metallized portion of the ceramic element;
   c. applying a cast iron element to the portion of said ceramic element covered with said alloy to form said engine component;
   d. simultaneously brazing said ceramic element to said cast iron element and austenitizing the microstructure of said cast iron element by heating said component in a vacuum to a temperature of about 1600 degrees F. to 1750 degrees F. for about one hour, and
   e. quenching said heated component in a gas selected from the group consisting of nitrogen and argon to cool said heated component at a controlled rate, thereby producing a core hardness of about 26 RC to about 31 RC in the cast iron element.

2. A method for joining a ceramic element and an austenitizable metal element that results in the simultaneous creation of a strong ceramic-to-metal joint and a normalized microstructure in the metal element, comprising forming a composite from a metallized ceramic element, an alloy and a metal element, wherein the alloy is interposed between the ceramic element and the metal element, heating the composite thus formed to a temperature of from about 1600 degrees F. to about 1700 degrees F. for about one hour in a vacuum to simultaneously braze the ceramic element to the metal element and austenitize the metal element; and cooling the brazed, austenitized composite by gas quenching to permit cooling at a controlled rate, thereby normalizing the microstructure of the metal element.

3. The method described in claim 1, wherein said assembly is a crosshead assembly.

4. The method of claim 2, wherein the austenitizable metal element is formed from cast iron.

5. The method of claim 3, wherein said alloy consists essentially of titanium, copper and silver.

6. The method of claim 4, wherein said composite is gas quenched in a gas selected from the group consisting of nitrogen, argon and gases having heat transfer capabilities similar to nitrogen and argon.

7. The method described in claim 2, wherein said metal element has a core hardness of from about 26 RC to about 31 RC following the gas quenching of said composite.

8. A method for forming an assembly for an internal combustion engine, said assembly having a ceramic component and an austenitizable metal component, including the steps of:
  a. metallizing at least a portion of the surface of the ceramic component;
  b. applying a brazing alloy compatible with the ceramic component to the metallized surface of the ceramic component;
  c. applying the metal component to the portion of the ceramic component containing the alloy to form the assembly;
  d. heating the assembly thus formed in a vacuum to a temperature within the range of 1600 degrees F. to 1750 degrees F. for about one hour to simultaneously braze said ceramic to said metal and austenitize the microstructure of said metal; and
  e. gas quenching the heated assembly to cool said assembly at a controlled rate and normalize the microstructure of said metal.

9. The method of claim 8, wherein said ceramic element is formed from silicon nitride.

10. The method of claim 9, wherein said austenitizable metal element is formed from cast iron.

11. The method of claim 10, wherein said alloy consists essentially of titanium, copper and silver.

12. The method of claim 11 wherein said assembly is gas quenched in a gas selected from the group consisting of nitrogen, argon and gases having heat transfer capabilities to nitrogen and argon.

* * * * *